July 14, 1925.
H. G. NELSON
WAGON SEAT FASTENER
Filed Feb. 16, 1924
1,545,918
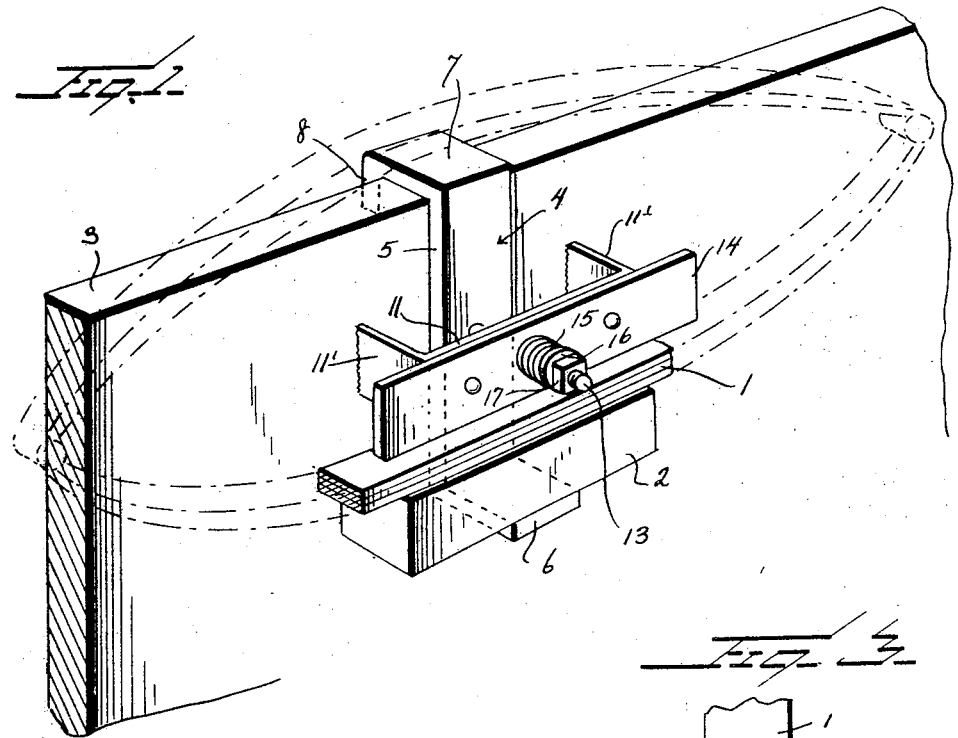
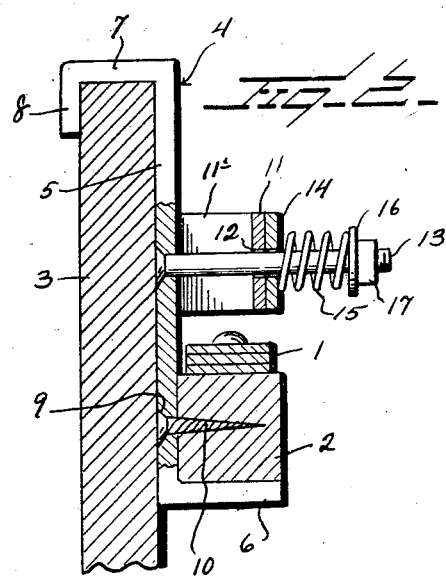
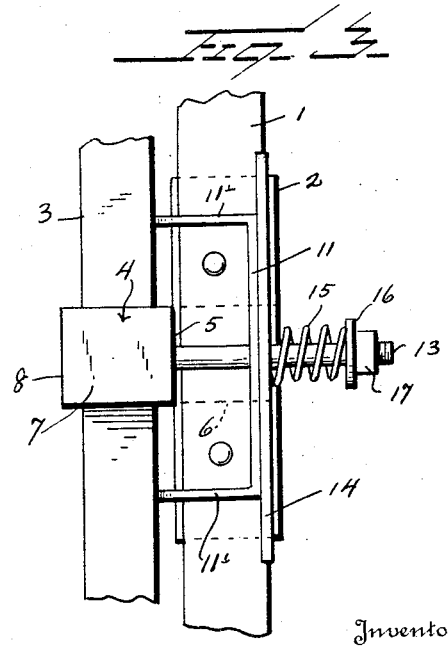
Inventor
H. G. Nelson
By Watson E. Coleman
Attorney Patented July 14, 1925.

1,545,918

UNITED STATES PATENT OFFICE.

HARRY G. NELSON, OF WESTON, NEBRASKA.

WAGON-SEAT FASTENER.

Application filed February 16, 1924. Serial No. 693,321.

*To all whom it may concern:*

Be it known that I, HARRY G. NELSON, a citizen of the United States, residing at Weston, in the county of Saunders and State of Nebraska, have invented certain new and useful Improvements in Wagon-Seat Fasteners, of which the following is a specification, reference being had to the accompanying drawings.

This invention relates to an improved wagon seat fastener for use in securing a wagon seat upon the side walls of a wagon box and one object of the invention is to provide a wagon seat fastener which is so constructed that the wagon seat may be easily and quickly put in place and very firmly held in place when in use.

Another object of the invention is to so construct this seat fastener that when desired it may be easily released so that the wagon seat can be removed from the wagon box.

Another object of the invention is to so construct this seat fastener that the releasable securing means may be positioned within the wagon box under the seat where it will be out of the way and not liable to be struck and broken.

This invention is illustrated in the accompanying drawings, wherein:—

Figure 1 is a perspective view showing the seat fastener in use.

Figure 2 is a vertical sectional view through the structure shown in Figure 1.

Figure 3 is a top plan view of the structure shown in Figure 1.

This improved wagon seat fastener is used for releasably attaching a conventional construction of wagon seat to the side walls of a wagon box. The seat will be provided with the usual supporting springs 1 which are secured to spring bars or strips 2. These springs and bars 2 fit into the wagon box between the side walls 3 and a fastener will be connected with each of the side walls and will engage the spring bars 2 beneath the springs at the opposite sides of the seat. These fasteners are of duplicate construction and may be readily applied to the spring bars.

Each of these fasteners is provided with a bracket or body portion 4 which is formed of iron bent to provide a shank portion 5, a foot 6 and a top member 7 terminating in a depending flange 8. The shank 5 will be positioned in engagement with the inner face of the wall of the wagon box and the top member 7 will be hooked over the edge of the side walls of the wagon body. The lower end portion of the shank 5 is provided with an opening 9 so that a screw, rivet or other suitable fastener 10 may be passed through this opening 5 and into the spring bar 2 to firmly hold the bracket in engagement with the spring bar. It will therefore be seen that this fastener will be permanently attached to the spring bar and therefore cannot become detached from the wagon seat when the seat is removed from the wagon box.

In order to securely but releasably hold the bracket in engagement with the wagon body wall, there has been provided a yoke 11 which extends transversely of the shank portion 5 of this bracket 4 and is provided with an opening 12 through which extends a bolt 13 carried by the shank 5. The arms 11' of this yoke 11 extend upon opposite sides of the shank 5 and terminate in serrated ends to provide teeth for biting into the wall of the wagon box. A plate 14 is secured upon the yoke and has its end portions extending so that when it is desired to release the wagon seat for removal from the wagon the end portions of this strip 14 may be grasped and the yoke pulled away from the wall of the wagon box against the action of the spring 15. This spring 15 is positioned about the bolt 13 and has one end engaging the plate 14 and its other end engaging a washer 16 which is slidably mounted upon this bolt and engaged by a nut 17. By adjusting the nut 17 upon the threaded end portion of the bolt the spring may be compressed the desired amount so that it will serve to force the arms of the yoke 11 into engagement with the walls of the wagon box and cause the teeth to bite into the wood and provide a very firm fastening means. When the arms are in engagement with the wall of the wagon box the bracket will be drawn towards the yoke by the bolt 13 and the flange 8 will have very firm frictional engagement with the wagon box. It will be further noted that when it is desired to remove the wagon seat it is only necessary to draw the yoke away from the wall of the wagon box and the bracket will be released from the wagon box so that the seat can be easily lifted off of the wagon box. A simple and very efficient fastener has therefore been provided to securely but releasably hold a wagon seat in place.

What is claimed is:—

1. A wagon seat fastener comprising a hanger to be suspended from the upper edge of a wagon box wall, means on the hanger for supporting a wagon seat spring, a bolt extending from said hanger, a yoke positioned transversely of the hanger and slidably mounted upon the bolt for movement towards and away from the hanger and having arms for engaging the side face of a wagon box wall, a strip secured upon the yoke and having portions extending beyond the ends of the yoke, a spring coiled about the bolt beyond the yoke, and means adjustable upon said bolt for engaging the spring and placing the spring under tension.

2. A wagon seat fastener comprising a hanger bracket having a hook-shaped upper end portion for engaging the upper edge of a wagon box wall and having its lower end portion provided with a foot for fitting beneath a spring bar of a wagon seat, a bolt extending from said bracket above said foot, a yoke slidable upon the bolt and positioned transversely of the hanger bracket and having arms extending upon opposite sides of the bracket for engagement with the side face of a wagon box wall, a spring upon the bolt to move the yoke towards the bracket, and means adjustably mounted upon the bolt to compress the spring and place the spring under desired tension.

3. Holding means for a wagon seat, comprising an angular hanger secured to each side of the seat, each hanger including a hook-like upper end portion engageable over the upper edge of the side of the wagonbox, a shank portion disposable against the inner face of the side of the box and an inwardly extending foot portion extending beneath the spring bar of the seat, a bolt secured to and extending inwardly from the shank portion of each hanger, a yoke slidably mounted on each bolt and arranged horizontally to straddle the hanger, and a spring on each bolt engaging the adjacent yoke for forcing it against the side of the box.

4. Holding means for a wagon seat, comprising an angular hanger secured to each side of the seat, each hanger including a hook-like upper end portion engageable over the upper edge of the side of the wagonbox, a shank portion disposable against the inner face of the side of the box and an inwardly extending foot portion extending beneath the spring bar of the seat, a bolt secured to and extending inwardly from the shank portion of each hanger, a yoke slidably mounted on each bolt and arranged horizontally to straddle the hanger, and a spring on each bolt engaging the adjacent yoke for forcing it against the side of the box, the yoke being U-shaped and having the ends of its arms formed with teeth penetratingly engaging the box.

5. Holding means for a wagon seat, comprising an angular hanger secured to each side of the seat, each hanger including a hook-like upper end portion engageable over the upper edge of the side of the wagonbox, a shank portion disposable against the inner face of the side of the box and an inwardly extending foot portion extending beneath the spring bar of the seat, a bolt secured to and extending inwardly from the shank portion of each hanger, a yoke slidably mounted on each bolt and arranged horizontally to straddle the hanger, and a spring on each bolt engaging the adjacent yoke for forcing it against the side of the box, and a nut on each bolt for varying the spring tension.

In testimony whereof I hereunto affix my signature.

HARRY G. NELSON.